July 17, 1962

D. L. SUTTON 3,044,454

COMBUSTION CHAMBERS OF COMPRESSION IGNITION
INTERNAL COMBUSTION ENGINES

Filed April 4, 1960

Douglas Leslie Sutton
Inventor

By: Scrivener and Parker
Attys.

United States Patent Office 3,044,454
Patented July 17, 1962

3,044,454
COMBUSTION CHAMBERS OF COMPRESSION IGNITION INTERNAL COMBUSTION ENGINES
Douglas Leslie Sutton, Solihull, England, assignor to The Rover Company, Limited, Solihull, England, a British company
Filed Apr. 4, 1960, Ser. No. 19,674
Claims priority, application Great Britain Apr. 7, 1959
7 Claims. (Cl. 123—32)

The invention relates to combustion chambers of compression ignition engines of the liquid fuel injection type, in which the whole or a substantial proportion of the charge is forced during each compression stroke through a transfer passage, duct-like portion or opening into a pocket constituting a combustion chamber of such shape to cause some form of swirl or turbulence of the charge.

In one known form of the particular engines referred to, part of the combustion chamber is constructed in such a fashion to form a heat insulated member having reduced heat conducting contact with the cooler surrounding parts of its housing; the transfer passage, duct-like portion or opening may be contained within the heat insulated member or remote from it.

It is well known that the combustion process is improved, in that such insulated parts reduce heat loss from the combustion space, act as thermal regenerators to increase compression temperatures and secure more heat at rising engine speeds to overcome to some extent the effects of ignition delay which tends to limit engine performance as the speed is increased.

Under ideal conditions the thermal mass or heat capacity of the hot members should be exceedingly small so that sufficient temperature for smooth or "knock-free" running is obtained almost instantaneously when the engine is started from cold. Also for maximum values of heat insulation, conservation and regeneration during operation, the thermal mass or in other words the material of the insulated part should cover a substantial area of the combustion pocket surface, be distributed as near as possible to this surface, have the smallest heat flow paths to and heat conducting contact with the cooler parts of the engine. Large sectional changes in the insulated mass should be avoided to reduce the possibility of thermal stress cracking.

Hot members forming substantially part or the whole of the combustion pocket in previous combustion systems are made from cast and/or machined components, and therefore reductions in insulated mass and dimension of heat conducting paths are naturally limited by the strength of the design and its most economical method of manufacture. Generally it is found that the mass and therefore the heat capacity of the hot members which are used is large enough to cause an undesirable length of time when starting with a cold engine before sufficient temperature is attained for normal running and that the proportions of the hot members are such that there are appreciably long heat paths and in consequence the temperature of their external surfaces is low enough to allow the formation of carbon which eventually fills the thin insulating air spaces between the member and the cooler parts of the engine resulting in greater heat conduction thereto; carbon, having a much greater coefficient of thermal conductivity than air or the normal gases of combustion, affects the insulation and the degree to which this will occur will depend on how tightly it becomes packed within the insulating spaces. Further, the ability of many previous forms of insulated combustion systems to run satisfactorily on a wide range of fuels is very much restricted, due to insufficient temperature in the combustion pocket to overcome the tendency for longer ignition delay inherent with fuels of low ignition quality, even so, in the few cases where it may be possible to run on fuels with ignition qualities ranging down to the high octane petrols, limitations are still imposed on the maximum speeds attainable, particularly with the smaller high speed engines, on account of the increasing effects of ignition delay with speed.

The present invention provides a new or improved construction of combustion chamber which will give considerably improved heat utilisation and which is relatively simple and cheap to manufacture.

By such construction the time to reach smooth or "knock-free" running with a cold engine is appreciably reduced, temperatures of compression are increased to improve starting, and temperatures within the combustion pocket during the operation of the engine overcome ignition delay tendencies to such an extent that it is possible to run smoothly and efficiently on a very wide range of fuels of varying ignition quality down to and including the most difficult fuels such as the high octane petrols, even at extremely high speeds and without resort to injection advance devices.

According to the invention the insulated member or members forming part or substantially the whole of the combustion pocket surface, with or without the previously mentioned transfer passage, duct-like portion or opening, are made from part-fabricated or wholly pressed heat resisting sheet metal.

The thickness of the sheet metal pressing is reduced to minimum which is well below the dimensions practicable in cast or machined insulated parts. In this way the thermal mass or heat capacity is reduced considerably. The heat flow paths to the cooler containing parts of the engine are restricted by the considerably smaller cross sections of sheet metal parts. A thin layer of air and/or gas is maintained substantially over the whole of the exterior surface of the insulated parts by using exceedingly small clearance spaces between these and the cooler parts of the engine. By allowing the gases to pass into these clearance spaces it is possible to reduce the pressure difference across the insulated member during combustion and therefore prevent overstressing of the metal. The much more uniform cross-sections of the thin insulated members will reduce the tendency for thermal stress cracking and the formation of the shape by pressing greatly assists in obtaining the maximum strength for such thin parts. The shortness of the heat path across the thin walls of the insulated parts ensures a sufficiently high temperature on the exterior surfaces of the insulated parts to stop carbonization on those surfaces and thus a clearance space will be maintained, allowing free access to the gases of compression and combustion, so as to use to the best advantage their extremely low coefficients of heat conduction and their temperature to conserve the maximum amount of heat within the combustion pocket.

In some applications of this invention the transfer passage or duct-like portion is insulated, and is fabricated or formed together with one part of the combustion chamber pressing which is contained within a plug-like member which also has limited heat conducting contact with the cooler parts of the engine, thus increasing the insulating properties.

According to another and preferred feature of this invention when it is applied to combustion chambers so designed to enforce a rotation of the charge about an axis approximately perpendicular to the axis of the transfer passage, the metal of the transfer passage is extended beyond the interior surface of the combustion pocket to form a wall-like ridge around its opening disposed so that the maximum projection is on the side of the opening first encountered by the rotating charge. The design and proportions of the ridge can be arranged to give a localised turbulence at the end of the fuel spraying period to obtain improved mixing of the charge and fuel particles, together with greater heat transfer from the metal of the passage to the charge in the chamber, to obtain shorter ignition delay and better rate of combustion.

Added advantages of this ridge are that it breaks up the layer of fuel moving substantially next to the interior surface of the combustion pocket, causing it to intermingle more thoroughly with the air-oxygen of the charge, and prevents the boundary layer of fuel from being swept too easily down the transfer passage without sufficient mixing.

The invention may be embodied in many different forms and covers a wide field but in order that it may be clearly understood and readily applied, some practical constructions will now be described with the aid of the accompanying drawings, in which.

Figure 1:
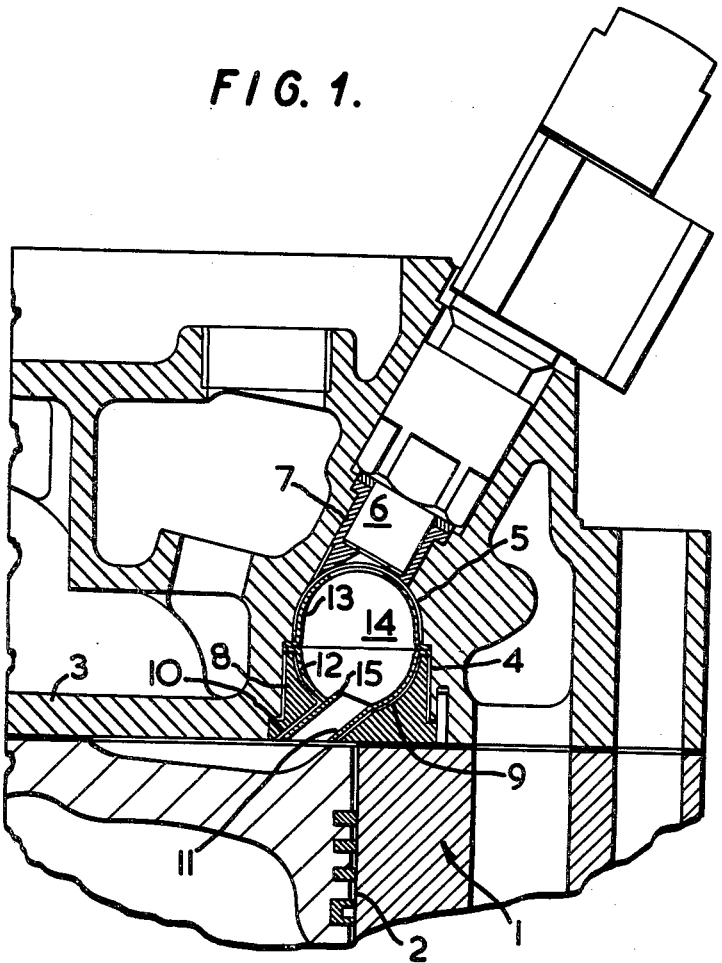
FIGURE 1 is a part sectional elevation of a rotary swirl type combustion chamber constructed in accordance with the invention and positioned in the cylinder head of an engine.

Referring first to FIGURE 1, a compression-ignition internal combustion engine has a cylinder block 1 containing the cylinder bores of which one is shown at 2, closed off by a cylinder head 3 in well known manner. In the cylinder head 3 adjacent to the bore 2, is formed a recess 4 extending from the upwards underside of the cylinder head 3. The inner end portion 5 of this recess 4 is substantially hemispherical in shape and within this is located a fuel injection nozzle 6 and a nozzle shroud 7.

Fitted in the recess 4 is a thermally insulated retaining plug 8 which has reduced external diameter inside the recess 4 to give limited heat conduction contact with the cooler walls of the recess. The retaining plug is pinned or pegged to prevent rotation by means not shown and its inner surface 9 is substantially hemispherical; passing through into this surface is an inclined bore 10 into which is received, with adequate and uniform radial clearance for thermal insulation, a thin walled tube 11 projecting from and joined to a thin sheet heat-resisting alloy pressing 12, flanged and substantially hemispherical in shape. The pressing 12 is situated in the plug 8 and supported on its flange by the inner end of the plug. The transfer passage formed by the tube 11 could be other than circular in cross section and the plug 8 suitably formed to receive it; however, the circular form is illustrated as this considerably facilitates and cheapens manufacture. A small clearance is maintained between the outer surface of the pressing 12 and the inner surface 9 of the retaining plug, providing a thin air gap over substantially the whole of the hemispherical surfaces. Another thin sheet heat-resisting, alloy pressing 13 which is flanged and approximately hemispherical in shape is situated in the inner end 5 of the recess 4 and held with its flange against a step formed in the recess. The lower face of the retaining plug 8 is made to project very slightly beyond the cylinder head face so that when the cylinder head 3 is tightened against the cylinder block 1, the retaining plug 8 is forced upwards to hold in position the shell-like pressings 12 and 13 by their flanges against the step in the recess 4.

The inner pressed shell 13 has its outer surface spaced away from the hemispherical inner surface of the end 5 of the recess 4 by a small clearance to provide a thin air space over most of the surface area. An aperture is suitably located in the top of the pressing 13 to permit the free entry of injected fuel into the combustion pocket 14 formed by the pressings 12 and 13. The combustion pocket 14 is substantially spherical in form and the clearance spaces around the pressings 12 and 13 are free to receive the gases of compression and combustion.

A further small aperture (not shown) suitably located in the inner pressing 13 provides means for using the well known additional starting aid in the form of an electrically heated glow plug.

The tube-like member 11 is joined to the outer shell 12 by welding and is positioned so that the air forced through it during the compression stroke is directed tangentially to a circle about an axis near or at the centre of the volume of the combustion pocket 14 and substantially or wholly perpendicular to the plane of the cross section FIGURE 1 illustrates. By this means the air is subjected to general rotation about the axis when the engine piston moves through its compression stroke.

The tube-like member 11 forming the transfer passage extends beyond the inner surface of the pressed shell 12 to form a wall like ridge 15 having its maximum projection relative to the inner hemispherical surface of the shell 12 on a plane passing through both the axis of the transfer passage and the centre of the combustion pocket, and this maximum projection is arranged at that part of the tube 11 first struck by the rotating charge as it passes round the pocket. In this way local turbulence of the charge is created in the region at the end of the fuel spray to utilize and transfer heat more quickly to the fuel, with resulting beneficial shortening of the ignition delay period.

It is to be understood that the design illustrated in FIGURE 1 is constructed to obtain good thermal insulation and thereby to conserve the heat within the combustion chamber; this will allow the engine to be run on a wide range of fuels down to those of low ignition qualities, including high octane petrols even at extremely high engine speeds with fixed injection timing.

In a modified arrangement the pocket or chamber alone could be formed by sheet metal pressings, the transfer passage being formed simply in the plug 8.

Figure 2:
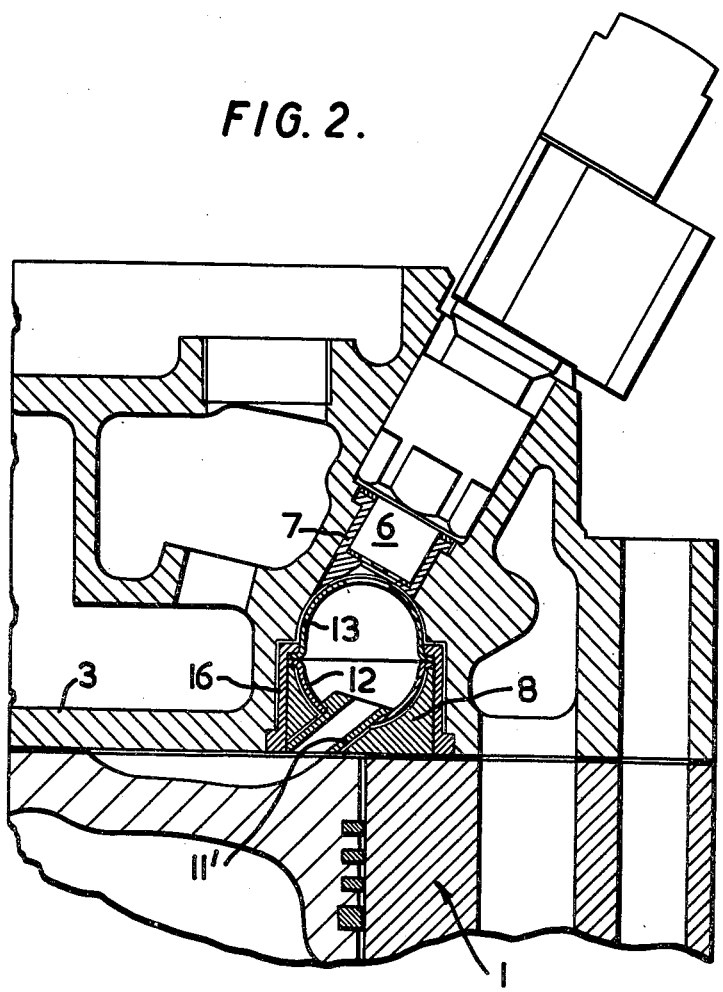
FIGURE 2 shows an alternative construction, similar to that shown in FIGURE 1.

In the construction FIGURE 2, the design is generally similar to that shown on FIGURE 1 and the same reference numerals are used where applicable, but it shows an alternative method of manufacture, and differs in that the plug type member 8 is contained within an outer case 16 which itself has limited contact with the cylinder head; the shells 12 and 13 are clamped between the flange on the outer case and the plug 8; the transfer passage 11 is formed in such a manner that it is held against the internal surface of the lower shell 12, and presents a greater mass projecting inside the chamber.

Figure 3:
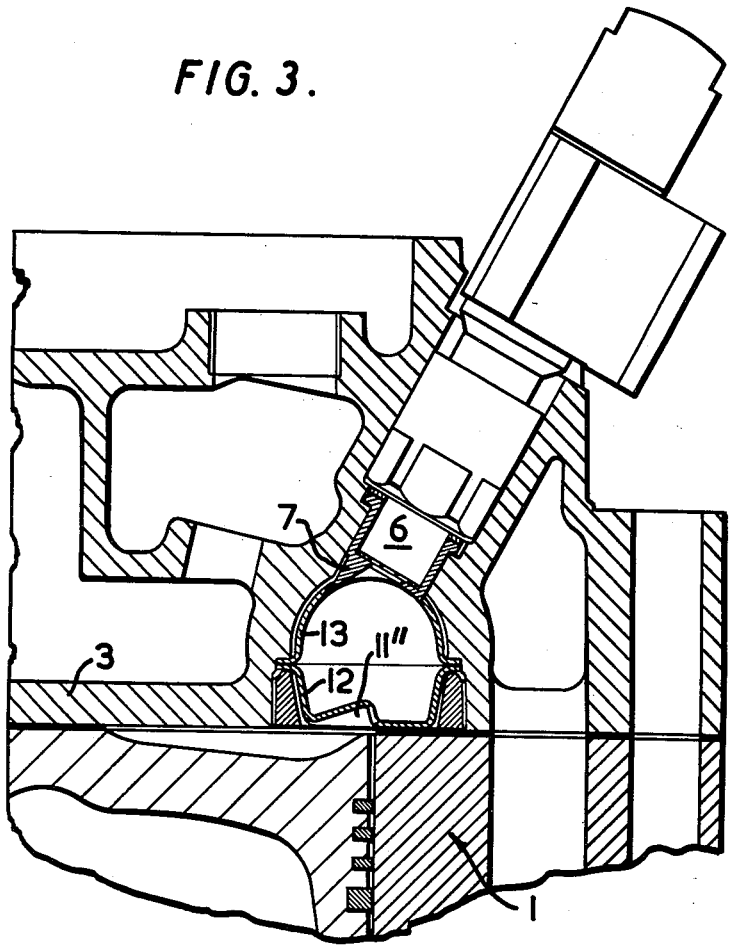
FIGURE 3 shows a construction where the lower shell and transfer passage are formed from one pressing.

In the construction shown in FIGURE 3 the lower half of the combustion chamber and the transfer passage are formed from one pressing. A portion of the metal of the base of the pressing 12′ is deformed inwards to form a transfer passage 11″, and the actual opening into the chamber takes the form of an elongated aperture.

In this design the transfer passage forms a negligible restriction and the internally projecting metal forming the transfer passage gives up a large part of its heat to the rotating charge within the chamber.

Figure 4:
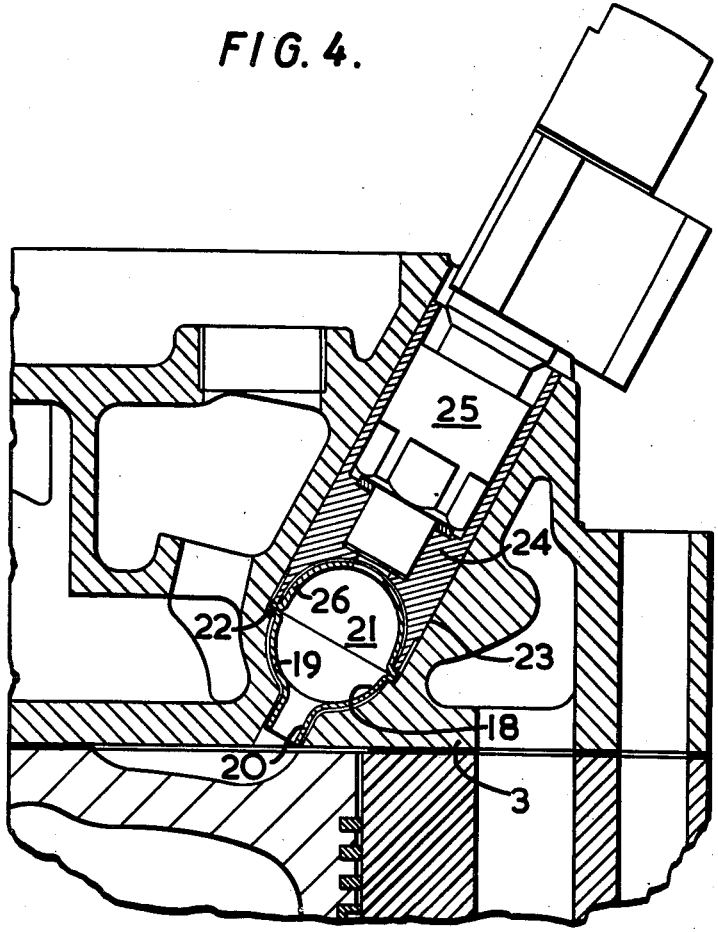
FIGURE 4 is a part sectional elevation of a precombustion type of chamber constructed in accordance with the invention and located within he cylinder head.

Referring now to FIGURE 4, this shows a pre-combustion chamber and the example is one showing the location of the pre-combustion chamber within the cylinder head wherein the injector, combustion pocket and transfer passage to the cylinder space all lie on one axis.

The cavity 18 formed in the cylinder head 3 is shaped to receive with small clearance a thin pressing 19 which is substantially hemispherical with a centrally disposed duct 20 for transferring the charge between the cylinder space and the combustion pocket 21. The pressing 19 is flanged and located against a circular stepped abutment 22 in the cavity 18 concentric with which is formed a bore 23 extending to the outside of the cylinder head 3. Located within the bore 23 is a plug-like member 24 which contains the injector 25 and which has its external diameter slightly reduced at the inner end to limit heat-conducting contact. The inside end of the plug-like member 24 is substantially hemispherical in shape and has located within it a thin pressing 26 which is also substantially hemispherical and spaced a small amount from it to provide a thin air space over practically the whole of the adjacent surfaces of the plug-like member 24 and the pressing. Fuel is admitted to the combustion pocket 21 through an aperture in the top of the pressing 26 which is held with its flange against the flange of the pressing 19, by means of the pressure exerted by the narrow annular end face of the plug-like member 19 when the injector 25 is fitted and tightened down in the cylinder head 3. It will be seen that the inner surface of the combustion pocket formed by the pressings is substantially spheroidal in shape and that the small clearance spaces existing at the external surfaces of the pressings are in communication with the gases of compression and combustion. A small aperture (not shown) suitably located in the inner pressing 26 provides means for the use of the well known addition starting aid in the form of an electrically heated glow plug.

Figure 5:
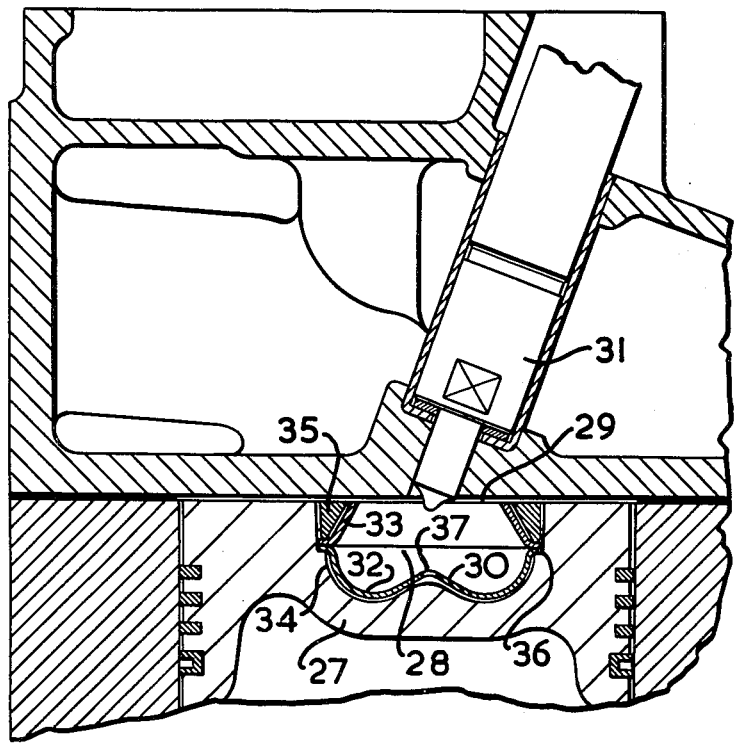
FIGURE 5 is a part sectional drawing illustrating an embodiment of the invention applied to a combustion chamber situated in the piston.

FIGURE 5 illustrates a typical embodiment of this invention applied to a combustion chamber located in the top of the engine piston. It will be seen that the shape of the combustion pocket 28 in the piston 27 is of the well known toroidal form. Air is admitted from the inlet valve in a direction tangential to the cylinder and is rotated about the cylinder axis, and during the compression stroke of the piston 27 the air, which is still rotating, is forced through a throttled opening 29, to be deflected by the curved walls of the combustion chamber 1 so that it performs a whirling motion which proceeds helically and in a circle guided by a protuberance 30.

The injector, shown at 31, is inclined relative to the cylinder axis and the combustion pocket 28 is offset relative to this axis. In other arrangements the centre line of the injector and combustion chamber may coincide with the cylinder axis.

The injector 31 is usually fitted with a multi-hole nozzle which discharges fuel close to the opening, the jets being suitably distributed and inclined at a wide cone angle.

In some combustion systems employing this shape of combustion pocket the main air movement inside thereof is toroidal and generated on compression, there being little or no rotation of the air in the cylinder induced on the induction stroke; in this case a nozzle of the poppet design is used, giving a single large conical sheet form of spray across the whole of the opening 29.

It will be seen from FIGURE 5 that the combustion pocket 28 is formed by the internal surfaces of two thin metal pressings 32 and 33 which are housed within a cavity 34 and a plug 35 in the piston 27. The pressings are held together by their flanges which are clamped between a circular stepped abutment 36 and a plug 35 which is screwed into the top of the piston 27 and which has limited heat conducting contact with the piston. The external surfaces of the pressings 32, and 33 are spaced slightly away from the internal surfaces of the cavity 34 and the plug 35 in the piston, to form thin insulating spaces which are free to receive the gases of compression and combustion via the resulting thin annular clearance at the top of the piston in the case of the upper pressing 33 and via a small aperture 37 in the protuberance 30 on the lower pressing 32.

As with the applications of this invention to combustion chambers situated in the cylinder head, the insulated mass and heat conduction paths are considerably reduced, the cross section of the material of the insulated parts in being uniform reduces the possibility of thermal stress cracking and the insulated surfaces are large to conserve and regenerate an appreciable amount of heat for improving combustion and extending the range of usable fuels. Furthermore, the light construction of the insulated parts makes it possible to incorporate insulated chambers into extremely high speed reciprocating pistons.

In any of the embodiments it is possible to weld the flanges of the two pressings together.

Further improvement in insulation could also be obtained by the use of heat barrier rings of refractory material interposed between the flanges and the external supporting parts, or alternatively the supporting surfaces of the flanges can be coated with a suitable ceramic material.

The pressings may be of any suitable alloy that will stand up to the temperature involved, for example, that known by the registered trade mark "Nimonic."

In a further modification of the invention only a part of the combustion chamber wall could be formed by a sheet metal pressing, the remainder being formed by the interior surface of the cavity in the cylinder head or piston, or by the interior surface of a known form of thermally insulated hot plug. For example, in the embodiment of FIGURE 1 or FIGURE 2 either the lower pressing 12 or the upper pressing 13 might be omitted.

The principles of heat insulation and utilization, illustrated by the constructions which have been described, may be applied to many different combustion systems and provide a cheap and effective way of converting existing engine designs.

I claim:

1. In an internal combustion engine of the compression ignition liquid fuel injection type, a piston and cylinder structure comprising a cylinder, a piston working in said cylinder, a combustion chamber, said chamber communicating with said cylinder through an opening through which a substantial proportion of the air charge is force during each compression stroke of said piston, and said chamber being of substantially spheroidal shape, first and second liners, each of said liners being of substantially hemispherical shape and being in the form of pressings made from heat-resisting metal sheet, said liners being disposed in said chamber and so shaped as to follow the contours of the wall of said chamber but to be spaced from that wall to leave a clearance space of substantially uniform thickness over substantially the whole of the interior surface of said chamber, said space being in communication with the interior of said liners, whereby it is exposed to the gases of compression and combustion.

2. In an internal combustion engine of the compression ignition liquid fuel injection type, a piston and cylinder structure comprising a cylinder, a piston working in said cylinder, a cylinder head closing the end of said cylinder, a combustion chamber, said chamber being formed in said head and communicating with said cylinder by way of an opening through which a substantial proportion of the air charge is forced during each compression stroke of said piston, a cylindrical plug, said cylindrical plug being received in said cylinder head and having limited heat-conducting contact therewith, and said cylindrical plug furthermore dividing said cylinder from said chamber and having said opening formed in it, part of the wall of said chamber being formed by a recess in said plug, and a liner for said chamber, said liner being of a pressed sheet of heat-resisting metal having a uniform thickness throughout its extent and being shaped to follow the contours of the recess in said plug but being spaced from the wall of said recess to form a heat-insulating clearance of substantially uniform thickness.

3. In an internal combustion engine of the compression ignition liquid fuel injection type, a piston and cylinder structure as in claim 2, comprising a further liner for said chamber, said further liner being of a pressed sheet of heat-resisting metal of a uniform thickness throughout its extent and being shaped to follow the contours of the interior of said chamber other than that portion defined by said recess, said further liner being spaced from the wall of said chamber to form a heat-insulating clearance of substantially uniform thickness.

4. In an internal combustion engine of the compression ignition liquid fuel injection type, a piston and cylinder structure comprising a cylinder, a piston working in said cylinder, a cylinder head closing the end of said cylinder, a combustion chamber, said chamber being formed in said head and communicating with said cylinder by way of an opening through which a substantial proportion of the air charge is forced during each compression stroke of said piston, a cylindrical plug, said cylindrical plug being received in said cylinder head and having limited heat-conducting contact therewith, and said cylindrical plug furthermore dividing said cylinder from said chamber and having said opening formed in it, part of the wall of said chamber being formed by a recess in said plug, and a liner for said chamber, said liner being of a pressed sheet of heat-resisting metal and being shaped to follow the contours of the recess in said plug but being spaced from the wall of said recess to form a heat-insulating clearance of substantially uniform thickness, said liner comprising a peripheral flange, and said cylinder head being provided around said chamber with a step against which said flange is clamped by said plug to locate said liner.

5. In an internal combustion engine of the compression ignition liquid fuel injection type, a piston and cylinder structure comprising a cylinder, a piston working in said cylinder, a cylinder head closing the end of said cylinder, a combustion chamber, said chamber being formed in said head and communicating with said cylinder by way of an opening through which a substantial proportion of the air charge is forced during each compression stroke of said piston, a cylindrical plug, said cylindrical plug being received in said cylinder head and having limited heat-conducting contact therewith, and said cylindrical plug furthermore dividing said cylinder from said chamber and having said opening formed in it, part of the wall of said chamber being formed by a recess in said plug, and a liner for said chamber, said liner being of a pressed sheet of heat-resisting metal and being shaped to follow the contours of the recess in said plug, but being spaced from the wall of said recess to form a heat-insulating clearance of substantially uniform thickness, said liner comprising a tubular extension, said tubular extension being disposed within said opening to define a passage forming a communication between said cylinder and the interior of said chamber.

6. In an internal combustion engine of the compression ignition liquid fuel injection type, a piston and cylinder structure comprising a cylinder, a piston working in said cylinder, a cylinder head closing the end of said cylinder, a combustion chamber, said chamber being formed in said head and communicating with said cylinder by way of an opening through which a substantial proportion of the air charge is forced during each compression stroke of said piston, a cylindrical plug, said cylindrical plug being received in said cylinder head and having limited heat-conducting contact therewith, and said cylindrical plug furthermore dividing said cylinder from said chamber and having said opening formed in it, part of the wall of said chamber being formed by a recess in said plug, and a liner for said chamber, said liner being of a pressed sheet of heat-resisting metal having a uniform thickness throughout its extent and being shaped to follow the contours of the wall of said chamber, other than that part of the wall formed by the recess in said plug, but being spaced from the wall of said chamber to form a heat-insulating clearance of substantially uniform thickness.

7. In an internal combustion engine of the compression ignition liquid fuel injection type, a piston and cylinder structure comprising a cylinder, a piston working in said cylinder, a cylinder head closing the end of said cylinder, a combustion chamber, said chamber being formed in said head and communicating with said cylinder by way of an opening through which a substantial proportion of the air charge is forced during each compression stroke of said piston, a cylindrical plug, said cylindrical plug being received in said cylinder head and having limited heat-conducting contact therewith, and said cylindrical plug furthermore dividing said cylinder from said chamber and having said opening formed in it, part of the wall of said chamber being formed by a recess in said plug, and a liner for said chamber, said liner being a pressed sheet of heat-resisting metal and being shaped to follow the contours of the wall of said chamber, other than that part of the wall formed by the recess in said plug, but being spaced from the wall of said chamber to form a heat-insulating clearance of substantially uniform thickness, said liner comprising a peripheral flange, and said cylinder head being provided around said chamber with a step against which said flange is clamped by said plug to locate said liner.

References Cited in the file of this patent

UNITED STATES PATENTS

| | | |
|---|---|---|
| 1,662,989 | Stroud | Mar. 20, 1928 |
| 2,065,025 | Ricardo | Dec. 22, 1936 |
| 2,741,229 | Stump | Apr. 10, 1956 |
| 2,865,346 | Liebel | Dec. 23, 1958 |
| 2,873,727 | Meurer | Feb. 17, 1959 |
| 2,979,043 | Meurer et al. | Apr. 11, 1961 |

FOREIGN PATENTS

| | | |
|---|---|---|
| 678,446 | Germany | July 15, 1939 |
| 749,282 | Germany | Nov. 20, 1944 |